(12) United States Patent
Koellmer et al.

(10) Patent No.: US 12,447,161 B2
(45) Date of Patent: Oct. 21, 2025

(54) TOPICAL PHARMACEUTICAL FORMULATION

(71) Applicant: RaDes GmbH, Hamburg (DE)

(72) Inventors: Melanie Koellmer, Hamburg (DE); Michael Herbig, Hamburg (DE); Dirk-Heinrich Evers, Reinbek (DE); Sascha Gorissen, Hamburg (DE)

(73) Assignee: RaDes GmbH, Hamburg (DE)

( * ) Notice: Subject to any disclaimer, the term of this patent is extended or adjusted under 35 U.S.C. 154(b) by 430 days.

(21) Appl. No.: 17/847,205

(22) Filed: Jun. 23, 2022

(65) Prior Publication Data
US 2022/0409634 A1 Dec. 29, 2022

(30) Foreign Application Priority Data
Jun. 25, 2021 (EP) .................... 21181878

(51) Int. Cl.
| | | |
|---|---|---|
| A01N 37/00 | (2006.01) |
| A01N 25/00 | (2006.01) |
| A01N 37/12 | (2006.01) |
| A01N 37/44 | (2006.01) |
| A61K 9/00 | (2006.01) |
| A61K 9/06 | (2006.01) |
| A61K 9/107 | (2006.01) |
| A61K 31/215 | (2006.01) |
| A61K 31/24 | (2006.01) |
| A61K 31/58 | (2006.01) |
| A61K 47/02 | (2006.01) |
| A61K 47/10 | (2017.01) |
| A61K 47/12 | (2006.01) |
| A61K 47/14 | (2017.01) |
| A61K 47/32 | (2006.01) |
| A61K 47/44 | (2017.01) |

(52) U.S. Cl.
CPC ............ *A61K 31/58* (2013.01); *A61K 9/0014* (2013.01); *A61K 9/06* (2013.01); *A61K 9/107* (2013.01); *A61K 47/02* (2013.01); *A61K 47/10* (2013.01); *A61K 47/12* (2013.01); *A61K 47/14* (2013.01); *A61K 47/32* (2013.01); *A61K 47/44* (2013.01)

(58) Field of Classification Search
None
See application file for complete search history.

(56) References Cited

U.S. PATENT DOCUMENTS

| | | | |
|---|---|---|---|
| 10,568,859 B2 | 2/2020 | Loupenok | |
| 2008/0044444 A1* | 2/2008 | Tamarkin | ................ A61K 8/86 |
| | | | 424/45 |
| 2021/0015927 A1 | 1/2021 | Tamarkin et al. | |

FOREIGN PATENT DOCUMENTS

| | | |
|---|---|---|
| DE | 102006034883 A1 | 1/2008 |
| WO | 2016157112 A1 | 10/2016 |
| WO | WO-2019224035 A1 * 11/2019 ........... A61K 31/573 |

OTHER PUBLICATIONS

"Decentralised Recognition Procedure Public Assessment Report", DE/H/2464/001/DC, Feb. 13, 2018, 6 pages.
"Efficacy of Antimicrobial Preservation", European Pharmacopoeia 7.0, 5.1.3, 2011, pp. 505-506.

* cited by examiner

*Primary Examiner* — Layla Soroush
(74) *Attorney, Agent, or Firm* — Synergy IP Group AG; Lily Ackerman

(57) ABSTRACT

The present disclosure provides pharmaceutical compositions comprising mometasone and diisopropyl adipate (DIPA) for topical administration. These compositions can be formulated as creams, lotions, and foams, and are particularly suitable for administration in hairy skin; for example, for treating inflammatory skin conditions, such as dermatitis, eczema, and psoriasis.

12 Claims, 5 Drawing Sheets

TOPICAL PHARMACEUTICAL FORMULATION

CROSS REFERENCE TO RELATED APPLICATIONS

This application claims priority to and the benefit of European Application No. EP21181878.6, filed on Jun. 25, 2021, which is incorporated herein by reference in its entirety.

BACKGROUND OF THE INVENTION

Mometasone is a synthetic anti-inflammatory corticosteroid used for treating skin conditions, allergic rhinitis, and asthma. Mometasone is generally used in pharmacotherapy as the salt, mometasone furoate, which is available as a 0.1% ointment and fatty ointment, for example for the treatment of steroid responsive dermatoses. Mometasone has been further formulated as a cream and as a hydroalcoholic solution. In the cream formulation, however, mometasone furoate is not fully incorporated in dissolved form, raising stability and performance issues such as crystal growth and variable skin permeation.

Mometasone is one of the topical corticosteroids with the most favourable efficacy-risk profile. Further, lotion and foam formulations of mometasone would be particularly advantageous for the treatment of body areas with hairy skin, as these types of formulations are easier to apply, are less dense, spread more easily than other topical dosage forms, and usually have patient acceptance. However, mometasone has a very low solubility in water, which impedes its formulation in aqueous-based compositions. Due to its high lipophilicity, mometasone can only be dissolved in a lipophilic carrier. However, there are limitations to the amounts of certain lipophilic carriers that can be used in topical formulations, as there is a limitation to the total amount of oily excipients in water-comprising formulations such as creams and lotions.

German patent application DE102006034883 discloses certain compositions comprising mometasone furoate as active ingredient, all of which contain hexylene glycol as a key excipient. However, it is generally believed that the use of alcohols, including polyalcohols such as hexylene glycol, in topical formulations should be minimised for tolerability reasons. In Example 3 of DE102006034883, a lotion composition is provided whose oil phase primarily consists of liquid paraffin. In view of the low solubility of mometasone furoate in liquid paraffin of about 0.05 mg/mL it is clear that such oil phase cannot accommodate the required amount of the active ingredient in dissolved form. Similarly, Example 9 of DE102006034883 discloses a composition designated as a lotion formulation having an oil phase composed of liquid paraffin, medium-chain triglycerides, propylene glycol caprylocaprate, and a small amount of diisopropyl adipate (DIPA) does not provide sufficient solubilisation capacity for the active ingredient. In other words, these lotions incorporate suspended particles of the active ingredient.

Moreover, a commercial lotion with mometasone furoate (Monovo® Lotion) was previously available on the market, at least in some countries, which also contained significant amounts of hexylene glycol. The active ingredient was partially dissolved in both the oil phase and the aqueous phase. In view of significant amounts of antisolvents including water, it appears that the formulation was oversaturated with the active ingredient, and therefore inherently associated with a recrystallisation risk, i.e., poor stability. The product is no longer marketed.

Therefore, there remains a critical need for developing mometasone compositions suitable for topical delivery, such as creams, lotions, and foams.

SUMMARY OF THE INVENTION

In some aspects, disclosed herein is a pharmaceutical composition for topical administration comprising an oil phase, said oil phase comprising mometasone and diisopropyl adipate, wherein the amount of diisopropyl adipate is at least 20 wt. % based on the weight of the oil phase.

In particular, the mometasone is incorporated in the form of mometasone furoate. In some related embodiments, the concentration of mometasone in the composition is from 0.05 wt. % to 0.1 wt. %. The oil phase as defined according to the invention allows the incorporation of mometasone in fully dissolved form, and in preferred embodiments, mometasone furoate is present in fully dissolved form in the oil phase.

In some related embodiments, the oil phase comprises a triglyceride oil. The triglyceride oil may be selected from medium-chain triglycerides, castor oil, and combinations thereof.

In some embodiments, the weight ratio of the diisopropyl adipate to the triglyceride oil is from 30:70 to 70:30.

In some embodiments, the content of mometasone in the oil phase is from 80% to 99% of the saturation concentration of mometasone in said oil phase.

In some further preferred embodiments, the composition is in the form of an emulsion. For example, the emulsion may be an o/w-emulsion. As part of an emulsion, the oil phase may, for example, represent from 25% to 50% of the weight of the composition. The emulsion may be liquid or semisolid. In some specific embodiments, the emulsion is foamed.

According to some embodiments, the pharmaceutical composition further comprises a first nonionic surfactant having an HLB value of about 5 and a second nonionic surfactant having an HLB value of about 15 to 16. The first surfactant may be a PEG-2 stearyl ether and/or the second surfactant may be a PEG-21 stearyl ether. The emulsion may comprise an aqueous phase having a pH in the range from 4.3 to 6.0.

The aqueous phase may further comprise a thickener. If the composition is in the form of a lotion, the thickener may, for example, be selected from xanthan, hydroxy ethyl cellulose, polyacrylate (carbomer), carboxymethylcellulose sodium or calcium, methyl cellulose, hydroxypropylcellulose, hydroxypropylmethylcellulose, alginate, sodium alginate or combinations thereof. The lotion may be pourable and exhibit a shear viscosity in the range from 0.1 to 0.5 Pa*s at 100/s (sometimes also expressed herein as 100 1/s or 100 s$^{-1}$).

In some other embodiments, the composition is in the form of a cream. In this case, the thickener may, for example, be selected from carbomers and water-soluble cellulose ethers. The cream may exhibit a zero-shear viscosity in the range from 50 000 to 150 000 Pa*s.

In further embodiments, the aqueous phase comprises an antimicrobial preservative which may be potassium sorbate or sorbic acid. Additional or alternative preservatives may be selected from phenoxy ethanol, benzyl alcohol, methyl paraben, ethyl paraben, propyl paraben or combinations thereof. In some further embodiments, the oil phase is free of paraffin and/or the water phase is free of polyalcohols.

In a further aspect, the pharmaceutical composition as disclosed herein is used in the treatment of a subject suffering from a dermatological disease or condition that is responsive to topical glucocorticoid therapy. The disease or condition may, for example, be selected from atopic dermatitis, atopic eczema, psoriasis, including scalp psoriasis, vitiligo or lichen sclerosus.

DETAILED DESCRIPTION OF THE INVENTION

Figure 1:
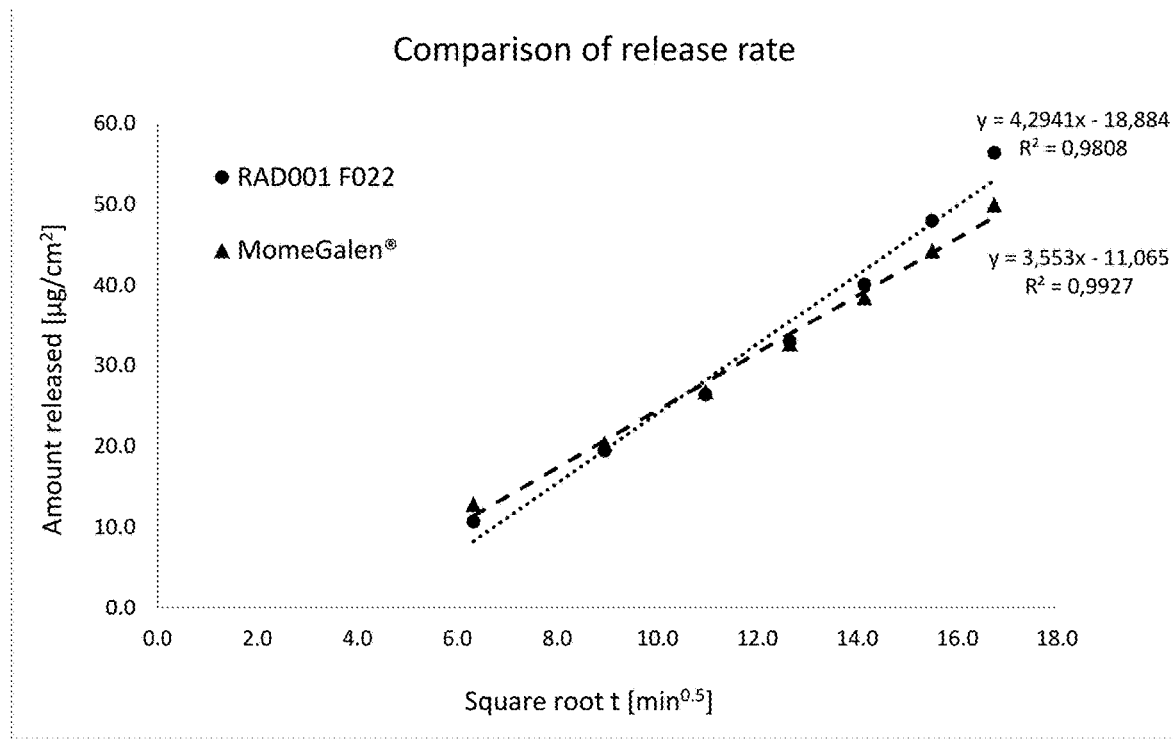
FIG. 1 shows the in vitro release kinetics for the lotion formulation F022 and the reference product, MomeGalen® cream.

In a first aspect, the invention provides a pharmaceutical composition for topical administration comprising an oil phase, said oil phase comprising mometasone furoate and diisopropyl adipate, wherein the amount of diisopropyl adipate is at least 20 wt. % based on the weight of the oil phase.

It has been found by the inventors that such composition can be used as a base for formulating improved creams, and even enables the formulation of lotions and foams. The use of an oil phase with such high content of diisopropyl adipate was found to allow the stable incorporation of mometasone furoate in fully dissolved form, without risk of recrystallisation, and at the same time to achieve desirable drug release rates.

The compositions are particularly advantageous for the treatment of conditions for which mometasone is indicated, such as scalp psoriasis, eczema, dermatoses, and other conditions of hairy skin areas. The formulations disclosed herein may be designed to be free from alcohols, such as propylene glycol, butylene glycol, hexylene glycol, free from polyethylene glycol (PEG), consistency enhancers, and paraffins, and thus particularly tolerable to the skin.

As used herein, a pharmaceutical composition is a composition that comprises a biologically active substance (or substance mixture)—also referred to as active ingredient, drug substance, pharmacologically or pharmaceutically active compound, and the like—having properties that make the substance potentially useful for diagnosing, treating, or preventing a medical condition. A skilled artisan would appreciate that a pharmaceutically active substance can be used either with a view to restoring, correcting, or modifying a physiological function by exerting a pharmacological, immunological, or metabolic action. A pharmaceutical composition may or may not be listed by an official pharmacopeia or formulary.

Topical administration, in the context of the present invention, comprises the administration of the pharmaceutical composition to a particular surface of the body. In preferred embodiments, the pharmaceutical composition of the invention is adapted for topical administration to the skin of a subject, in particular to a human subject.

A phase, as used herein, refers to a portion or domain of a system having substantially uniform physical and chemical properties. For example, a liquid emulsion may represent a two-phase system comprising two phases that are not miscible with one another, wherein each phase of the phases is substantially uniform with respect to its physical properties and chemical composition.

An oil phase, in the context of the invention, should be understood as a liquid or semisolid phase with substantially lipophilic character. Typically, an oil phase is not miscible with an aqueous liquid phase. An oil phase may exist as a single-phase system, such as an oily solution, or it may be part of a two-phase or three-phase system, such as an emulsion.

As used herein, when specifying the amount of an oil phase in an emulsion, the amounts of the surfactant or surfactants that stabilise the emulsion are not counted as part of the oil phase, unless the context dictates otherwise. For example, for an o/w-type emulsion comprising 20 g of oil, 3 g of surfactant and 77 g of aqueous buffer, the amount of oil phase is provided as 20 g, or 20 wt. % of the emulsion, respectively. This is primarily for convenience when specifying quantities, in spite of the fact that surfactant molecules may be partially immersed in the oil phase. If a drug substance is also present in the oil phase in dissolved form, its amount is also calculated as part of the oil phase.

In the context of the invention, an "amount" may refer to any type of quantity, whether absolute or relative, as the context requires. For example, an amount of diisopropyl adipate of at least 20 wt. % based on the weight of the oil phase may also be expressed as the diisopropyl adipate content or concentration in the oil phase. Similarly, an amount of mometasone furoate from 0.05 wt. % to 0.1 wt. % in the composition may also be expressed as the mometasone content or strength.

Mometasone is a synthetic anti-inflammatory corticosteroid used for treating certain skin conditions, but also allergic rhinitis, and asthma. In medicaments, mometasone is generally used as its furoate ester, having the chemical name of 9α,21-dichloro-11β,17α-dihydroxy-16α-methylpregna-1,4-diene-3,20-dione 17-(2-furoate), the empirical formula $C_{27}H_{30}Cl_2O_6$, and a molecular weight of 521.45. In this disclosure, the terms "mometasone" and "mometasone furoate" may also be used interchangeably, having all the same qualities and meanings, unless the context dictates otherwise. Also included are in principle also any solvates or physical forms of mometasone furoate.

In some embodiments, the pharmaceutical composition comprises, or is prepared by incorporating, a solvate of mometasone, a solvate of a pharmaceutically acceptable salt of mometasone, such as a solvate of mometasone furoate.

In some of the generally preferred embodiments, mometasone furoate is the sole bioactive ingredient in the composition. Alternatively, in some specific embodiments, a further active ingredient may also be present.

Mometasone furoate is characterized by a high lipophilicity, with a log P of about 4; and by a low water solubility, of about 0.95 µg/mL. Further, mometasone furoate has a poor solubility in apolar oils, and only a moderate solubility in many more polar oils. Mometasone solubility in pure alcohols is moderate to good, but it steeply decreases in the presence of water. Therefore, the formulation of mometasone in aqueous compositions poses significant difficulties. Even when considering dissolving mometasone in the oil phase of an emulsion, this would normally be very challenging due to regulatory limitations with respect to the concentrations of certain oily components for the topical administration. Moreover, the amount of an oil phase in an emulsion is also generally limited.

As disclosed in the Examples section, it has now been found by the inventors that mometasone furoate can be solubilized in a composition comprising diisopropyl adipate (DIPA), wherein the composition exhibits satisfactory pharmaceutical and pharmacological characteristics.

Diisopropyl adipate (DIPA), also referred to as hexanedioic acid di-isopropyl ester or adipic acid di-isopropyl ester, is a diester of isopropyl alcohol and adipic acid, having the empirical formula $C_{12}H_{22}O_4$.

As mentioned, the DIPA amount, or concentration, is at least about 20 wt. %, based on the weight of the oil phase. In one of the preferred embodiments, the amount of DIPA is in the range from about 20 wt. %, to about 99.95 wt. %, based on the weight of the oil phase.

In a further preferred embodiment, the amount of DIPA is at least about 25 wt. %, or at least 30 wt. %, respectively, such as in the range from about 25 wt. % to about 99.95 wt. %, or from about 30 wt. % to about 99.95 wt. %. Again, the basis of the percentage is the weight of the oil phase, as defined above.

Also preferred are embodiments in which the amount of DIPA is selected in the range from about 25 wt. % to about 95 wt. %, or from about 30 wt. % to about 90 wt. %, relative to the weight of the oil phase. These preferred embodiments are also characterised in that a further component is present in the oil phase, for example an oil, such as castor oil or medium-chain triglycerides (MCT). In further preferred embodiments, the amount of DIPA in the oil phase is in the range from about 30 wt. % to about 80 wt. %, such as about 30 wt. %, 35 wt. %, 40 wt. %, 45 wt. %, 50 wt. %, 55 wt. %, 60 wt. %, 65 wt. %, 70 wt. %, 75 wt. %, or 80 wt. %, respectively.

The amount of DIPA in the oil phase is preferably also selected with an eye on the amount of oil phase in the composition. For example, the amount of DIPA in the oil phase may be selected such as to yield a DIPA content in the composition in range of about 15 wt. % to about 20 wt. %, i.e., relative to the total weight of the composition, which is also one of the particularly preferred embodiments. Furthermore preferred is a DIPA content in the range from about 17 wt. % to about 20 wt. % relative to the total weight of the composition, such as about 17 wt. %, 18 wt. %, 19 wt. %, or 20 wt. %, respectively. For example, compositions with an oil phase representing about 50 wt. % of the composition wherein the oil phase comprises about 40 wt. % of DIPA exhibit a DIPA content of about 20 wt. % relative to the total weight of the composition.

The amount of mometasone furoate is typically selected with an eye on the total weight of the composition, as this defines the strength of a medicinal product for topical use. In general, the concentration of mometasone furoate according to the invention comprises any concentration that is pharmacologically useful or acceptable by the relevant regulatory agencies. For example, the concentration of mometasone furoate may be selected within a range between 0.005 and 1 wt. %, based on the total weight of the composition. In some embodiments, the concentration of mometasone is a range between 0.01 and 0.5 wt. %. In a particularly preferred embodiment, the concentration of mometasone furoate is in the range from about 0.05 wt. % and 0.1 wt. %, such as about 0.05 wt. % or in particular about 0.1 wt. %. In this context, the expression "about" is used to include all pharmaceutically acceptable deviations from a formal target strength; for example, "about 0.1 wt. %" may include the range from 0.09 wt. % to 0.11 wt. % or other ranges accepted by regulatory agencies as batch release or shelf-life specifications for topical products with mometasone.

As mentioned, one of the key advantages of the invention is that the oil phase of the composition allows for the incorporation of mometasone furoate in fully dissolved form, in particular at a drug concentration or strength of about 0.05 wt. % to 0.1 wt. %. Accordingly, in one of the preferred embodiments, the mometasone furoate comprised in the composition is fully dissolved in the oil phase. In other words, crystals or solid particles of mometasone furoate are substantially absent in the composition according to this preferred embodiment. It is noted that this feature of the invention contributes substantially to superior product performance, especially in terms of drug release and skin permeation.

In other embodiments, at least 50%, 60%, 70%, 80%, or 90% of the mometasone furoate comprised in the composition is dissolved in the oil phase.

In a further preferred embodiment, the oil phase comprises at least one further excipient, in particular at least one further lipophilic solvent, such as an oily carrier. Such oily carrier may be native, synthetic, or semisynthetic. For example, it may be selected from vegetable oils, animal oils, mineral oils, ester oils, silicon oils, or waxes.

Among the preferred oily carriers are triglyceride oils. Triglyceride oils are typically liquid or semisolid (at normal temperature and pressure) materials whose main ingredients are triglycerides, such as vegetable oils, animal-derived oils, or semisynthetic oils, of which the vegetable oils and semisynthetic oils are preferred.

A skilled artisan would appreciate that a triglyceride oil, sometimes also referred to as fatty oil or fat, refers to a bulk storage material produced by plants, animals and microorganisms that contain aliphatic moieties, such as fatty acid triglycerides and related derivatives. Triglycerides, also termed triacylglycerols or triacylglycerides, are esters derived from glycerol and three fatty acids. Triglycerides are the main constituents of body fat in humans and of vegetable fat. Many types of triglycerides exist, and any of them can be used in the pharmaceutical compositions disclosed herein. A triglyceride oil may comprise saturated and/or unsaturated triglycerides. In some embodiments, the triglyceride oil is semisolid or liquid at normal conditions. In some preferred embodiments, the triglyceride is liquid at normal conditions. Further, as used herein, triglyceride oils may comprise a mixture of chemically distinct triglycerides.

In some of the preferred embodiments, the triglyceride oil is selected from medium-chain triglycerides, castor oil, soybean oil, peanut oil, olive oil, almond oil, caprylic triglyceride. In some particularly preferred embodiments, the triglyceride oil comprises medium chain triglycerides and/or castor oil. Medium chain triglycerides are often obtained from optionally purified or modified palm oil or coconut oil. They predominantly comprise a mixture of triglycerides of saturated fatty acids, mainly of caprylic acid and of capric acid. They contain at least 95% of saturated fatty acid residues. Castor oil is also predominantly a triglyceride of fatty acids. The fatty acid composition is approximately ricinoleic acid (about 87%); oleic acid (about 7%); linoleic acid (about 3%); palmitic acid (about 2%); stearic acid (about 1%) and trace amounts of dihydroxystearic acid.

In some embodiments, the weight ratio of DIPA to the triglyceride oil is from 10:90 to 90:10, from 20:80 to 80:20, from 30:70 to 70:30, from 60:40 to 40:60, or 50:50, respectively. In some preferred embodiments, the weight ratio of DIPA to the triglyceride oil is from 30:70 to 70:30. If more than one triglyceride oil is used, these ratios should be understood as weight ratios of the DIPA to the total amounts of triglycerides in the oil phase, or in the composition.

The type and amount of the further oily carrier (such as a triglyceride oil) and the ratio of the DIPA to the further oily carrier may also be selected with an eye on the solubility of the mometasone furoate in the resulting oil phase. In some embodiments, the solubility of mometasone furoate in the oil phase is in the range of 2 to 5 mg/ml. In some preferred embodiments, the oil phase is selected such that the solubility of mometasone furoate in it is in the range of 2.5 to 4 mg/ml.

In some further embodiments, an oil phase is selected for the composition of the invention in which the content of mometasone furoate is below its saturation concentration in that oil phase, such as from about 70% to about 99% of the saturation concentration. In some preferred embodiments, the content of mometasone furoate is from 75% to 99% of the saturation concentration.

In one of the preferred embodiments, the pharmaceutical composition comprises from about 0.05 to about 0.1 wt. % of mometasone furoate fully dissolved in an oil phase comprising at least 20 wt. % of DIPA and at least one triglyceride oil, wherein the weight ratio of the DIPA to the triglyceride oil(s) is from about 30:70 to 70:30.

As mentioned before, a particularly advantageous use of the oil phase as described herein is for the preparation of an emulsion. It is therefore a preferred embodiment of the invention in which the pharmaceutical composition is in the form of an emulsion.

In other words, the pharmaceutical compositions disclosed herein may contain two or more phases, wherein one of these is an oil phase and one is an aqueous phase. In some preferred embodiments, the composition is in the form of an oil-in-water (o/w) emulsion, i.e., an emulsion in which the oil is the dispersed phase and water is the continuous phase. Such emulsion is preferably liquid or semisolid. A particular advantage of the invention is that it allows the incorporation of mometasone in fully dissolved form, even in case the formulation is designed as an oil-in-water (o/w) emulsion. Depending on the site of administration, o/w-emulsions are much better accepted by patients than other formulation types. For example, fatty ointments or o/w-emulsions are not considered as desirable for administration to the scalp.

In some embodiments, the oil phase represents from 10% to 65%, from 15% to 60%, from 20% to 55%, from 25% to 50%, from 30% to 45%, or from 35% to 40% of the weight of the composition. In some preferred embodiments, the oil phase represents from 25% to 50% of the weight of the composition. In a further preferred embodiment, the oil phase represents from about 30% to about 45% of the composition. As mentioned, in the context of quantifying the amount of oil phase in the composition, the surfactant content is not considered as part of the oil phase. These ranges are particularly preferred in cases in which the composition is in the form of an o/w-emulsion.

In one of the preferred embodiments, the pharmaceutical composition is in the form of an o/w-emulsion and comprises from about 0.05 to about 0.1 wt. % of mometasone furoate fully dissolved in an oil phase comprising at least 20 wt. % of DIPA and at least one triglyceride oil, wherein the weight ratio of the DIPA to the triglyceride oil(s) is from about 30:70 to 70:30, and wherein the oil phase represents from about 25% to 50% of the o/w-emulsion.

In some embodiments, the emulsion is foamed. In other words, the composition is in the form of a foam that comprises the emulsion as described above. A skilled artisan would appreciate that a foam refers to a liquid, semi-solid, or solid composition in which pockets of gas are trapped. In the case of a foamed emulsion, the foam is a system comprising at least three phases, i.e., the aqueous phase, the oil phase, and a dispersed gas phase. These formulations are generally easier to apply, are less dense, spread more easily than other topical dosage forms, and usually have patient acceptance.

The pharmaceutical compositions disclosed herein may further comprise a surfactant. In some preferred embodiments, the compositions comprise a first and a second surfactant. In some embodiments, the compositions comprise more than two surfactants. In an emulsion, the function of a surfactant is that of an emulsifier. In general, the surfactant(s) may be present in any amount that is commonly considered appropriate for topical pharmaceutical emulsions. For example, the total surfactant amount may be selected in the range from about 0.1 wt. % to about 20 wt. %. It is clear to a skilled person that the desirable amounts will also depend on the type of surfactant(s). In some embodiments, the surfactant(s) represent from about 0.5 wt. % to about 10 wt. % of the weight of the emulsion.

According to a further preferred embodiment, the composition of the invention comprises at least one nonionic surfactant. Also preferred are compositions comprising two or more surfactants, in which both or all surfactants are nonionic surfactants. If two (or more) surfactants are used, it is preferred that they differ in their properties, in particular with respect to their hydrophilic-lipophilic balance (HLB). For example, the first surfactant may have a relatively low HLB value, such as below about 10, and the second surfactant a relatively high HLB value, such as above 10.

In a specific embodiment, the first surfactant has an HLB value of about 5 and/or the second surfactant has an HLB value of about 15 to 16. For example, the first surfactant may be PEG-2 stearyl ether, and the second surfactant may be PEG-21 stearyl ether.

In a further embodiment, the composition comprises an antioxidant to further increase the stability and shelf-life of the composition. The antioxidant may be selected, for example, from butylated hydroxytoluene (BHT), butylated hydroxyanisole (BHA), propyl gallate, ascorbic acid, ascorbyl palmitate, tocopherol, or combinations thereof.

The pharmaceutical compositions disclosed herein are intended for topical use, they are preferably formulated as emulsions to be administered onto the skin. Accordingly, pH may be adjusted to a pH suitable for skin application, taking into consideration stability issues relating to mometasone. The composition pH may be adjusted by use of one or more pH adjusting agent, which can be selected e.g., from the group of hydrochloric acid, phosphoric acid, sodium hydroxide, citrate buffer, sodium citrate, phosphate buffer, phthalate buffers, acetate buffers, and succinate buffers. In some preferred embodiments, the pH of the aqueous phase is in the range from 4.3 to 6.0. In some embodiments, the pH of the aqueous phase is in the range from 4.5 to 5.0.

A skilled artisan would appreciate that the emulsions disclosed herein can be prepared at different viscosity grades, for example by adding a thickener, or a viscosity-increasing agent. A number of thickeners are available in the prior art which may be used for preparing the compositions disclosed herein. While thickeners increase viscosity, provide body, increase stability, and improve the suspension, they do not substantially modify or other characteristics of the compositions.

A skilled artisan would further appreciate that a shear-thinning behaviour may also be desirable for certain types of compositions such as lotions, as it allows good physical stability and spreadability. The viscosity of the compositions can be analysed by any of rheometer available in the art, as for example the MCR 102 (Anton Paar GmbH) rheometer, using a CC27 cylinder, at 20° C. temperature.

In some embodiments, the composition is formulated as a pourable lotion, preferably having a shear viscosity of less than 1 Pa*s at 100/s. In one of the preferred embodiments, the lotion exhibits a shear viscosity in the range from about 0.1 to about 0.5 Pa*s at 100/s. In further preferred embodiments, the viscosity is in the range from about 0.1 to about 0.25 Pa*s at 100/s, such as about 0.15 Pa*s at 100/s.

When the composition is formulated as a lotion, the thickener may preferably be selected from xanthan, hydroxy ethyl cellulose, polyacrylate (carbomer), carboxymethylcellulose sodium or calcium, methyl cellulose, hydroxypropylcellulose, hydroxypropylmethylcellulose, alginate, sodium alginate, or any combinations thereof. In some preferred embodiments, the thickener comprises xanthan.

The useful amounts of thickeners to be incorporated in lotion formulations are generally known in the art. The amounts may be selected in consideration of the type of thickener and the relative amount of the aqueous phase in the emulsion. For example, xanthan is particularly useful at amounts of 0.1 wt. % to 1 wt. %, relative to the weight of the emulsion. In some embodiments, a lotion formulated according to the invention comprises from about 0.2 wt. % to about 0.5 wt. % of xanthan, or from about 0.25 wt. % to about 0.4 wt. %.

In other preferred embodiments, the composition is formulated as a cream, which means that is exhibits a substantially semisolid rheological behaviour. In this case, the shear viscosity is preferably selected in the range from about 1 to about 5 Pa*s at 100/s. In further preferred embodiments, the viscosity is in the range from about 3.5 to about 4.5 Pa*s at 100/s. In some embodiments, the cream exhibits a zero-shear viscosity in the range from about 50 000 to about 150 000 Pa*s.

When the composition is formulated as a cream, the thickener is preferably selected from carbomers and water-soluble cellulose ethers.

Useful amounts of thickeners to be incorporated in cream formulations are generally known in the art. The selection of the amounts should take the type of thickener and the amount of the aqueous phase into consideration. For example, carbomers are particularly useful at amounts of about 0.2 wt. % to 10 wt. %, relative to the weight of the emulsion. In some specific embodiments, a cream formulated according to the invention comprises from about 0.5 wt. % to about 2 wt. % of carbomer.

In further preferred embodiments, the composition is provided in the form of a foam, more specifically in the form of a foamed emulsion. For example, the lotions described above may be foamed by conventional means using a propellant which is typically a compressed gas or volatile liquid. Examples of potentially suitable propellants include propane, n-butane, isobutane, carbon dioxide, dimethyl ether, ethyl methyl ether, or any combinations thereof.

Such foam compositions are physically stable or at least semi-stable at normal conditions. In some embodiments, the foam structure is stable for at least 10 minutes. In some embodiments, the foam structure is physically stable for at least 20, 30, 40, or 60 minutes.

The emulsions and foams of the invention may be prepared by generally known techniques. For example, the mometasone furoate may be dissolved in the oil phase or in a constituent of the oil phase in which it has a good solubility, such as DIPA. This may, for example, be done by combining the respective constituents and stirring, optionally at elevated temperatures, such as between 40° C. and 80° C. If a surfactant having a relatively low HLB value is used, this may also be initially dissolved in the oil phase. Separately, the aqueous phase may be prepared by mixing and/or dissolving the water-soluble constituents using a stirrer, optionally at elevated temperatures. Subsequently, the oil phase and the aqueous phase may be combined and using standard homogenisation equipment. Also, for incorporating a compressed or liquified gas propellant into the emulsion in order to obtain a foamable composition, the commonly known tools and techniques may be used.

For all compositions disclosed herein that are in the form of (optionally foamed) emulsions and which therefore comprise an aqueous phase in addition to the oil phase, it may be useful to incorporate an antimicrobial preservative. In particular, if the composition is intended for a multidose product presentation, it is preferred that it comprises a preservative, or a combination of preservatives. A skilled artisan would appreciate that any antimicrobial preservative can be used in the preparation of the pharmaceutical composition disclosed herein, as long as it does not interfere with the pharmacokinetic and pharmacodynamic properties of the compositions.

In some embodiments, the antimicrobial preservative is selected from potassium sorbate, sorbic acid, phenoxy ethanol, benzyl alcohol, methyl paraben, ethyl paraben, propyl paraben, or any combination thereof. In one of the preferred embodiments, the preservative sorbic acid and/or potassium sorbate, which have been found to be highly compatible with the other essential and preferred constituents of the composition and sufficiently effective to achieve compliance with the relevant preservation efficacy criteria of the US pharmacopeia (USP), as well as with the A and B criteria of the preservative efficacy test of Ph. Eur. 5.1.3.

In some further embodiments, the oil phase is free of paraffin. In some embodiments, the aqueous phase is free of polyalcohols. In further preferred embodiments, the oil phase is free of paraffin and the aqueous phase is free of polyalcohols.

The pharmaceutical compositions disclosed herein preferably exhibit a chemical stability that meets the relevant regulatory guidelines for medicinal products. In some preferred embodiments, the compositions have a shelf-life of at least two years at 25° C. In some embodiments, the compositions have a shelf-life of at least 1, 2, 3, 4, or more years, respectively.

In some embodiments, the pharmaceutical compositions disclosed herein are white, and said white colour is stable for at least 12 weeks. They preferably do not have any unpleasant odour, or only a slight characteristic odour, and no change of odour occurs in at least 12 weeks. They typically show a homogeneous microscopical appearance, which remains stable for at least 12 weeks.

The pharmaceutical composition of the invention may show an in vitro release profile of mometasone that is similar or better than that of MomeGALEN® 1 mg/g, or a skin penetration of mometasone similar or better than that of MomeGALEN® 1 mg/g cream, or of MONOVO® 1 mg/g emulsion.

The pharmaceutical composition disclosed herein can be used for any medical condition for which topical mometasone furoate is indicated. In some embodiments, the compositions can be used for treating any dermatological disease for which topical corticosteroids are indicated. The lotion, cream, and foam formulations disclosed herein are especially suitable for treating dermatological conditions. In some embodiments, the compositions are used for preventing, ameliorating, or treating an inflammatory skin disorder.

As used herein, the term "treatment" refers to any process, action, application, therapy, wherein a subject, including a human being, is subjected to medical aid with the object of improving its health condition. In some embodiments, treating comprises reducing incidence, alleviating symptoms, eliminating recurrence, preventing recurrence, preventing incidence, improving symptoms, improving prognosis or combinations thereof in other embodiments. In some embodiments, treating comprises ameliorating an existing condition, which does not necessarily result in the complete absence or removal of symptoms. A treatment may also comprise palliative effects, i.e., reducing the likelihood of a subsequent medical condition.

Some of the preferred therapeutic uses of the compositions include atopic dermatitis, atopic eczema, psoriasis, scalp psoriasis, vitiligo, or lichen sclerosus. In some embodiments, the compositions are used for treating dermatitis, seborrheic dermatitis, xerotic eczema, discoid eczema, venous eczema, dermatitis herpetiformis, neurodermatitis or autoeczematization. In some embodiments, the compositions are used for treating skin redness, skin edema, itching, crusting, flaking, blistering, cracking, oozing and discomfort. In some preferred embodiments, the composition is in the form of a cream and used for the treatment of atopic dermatitis, atopic eczema, psoriasis, vitiligo, or lichen sclerosus. In further preferred embodiments, the composition is in the form of a lotion or foam and used for the treatment of scalp psoriasis.

Optionally, the compositions may be used to treat two or more conditions concomitantly. A skilled artisan would appreciate that, in some embodiments, treating an inflammatory skin disease comprises reducing the lesion area, or reducing the severity of the skin lesion. In some embodiments, treating a skin disorder comprises maintaining the lesion at constant size and severity. In some embodiments, treating an inflammatory skin disease comprises ameliorating the patient's wellbeing.

In a related aspect, the invention provides methods of treatment, such as a method treating a subject, in particular a human subject, suffering from an inflammatory skin disease, such as atopic dermatitis, atopic eczema, psoriasis, scalp psoriasis, vitiligo or lichen sclerosus, comprising a step of administering a pharmaceutical composition comprising an oil phase, said oil phase comprising mometasone furoate and DIPA, wherein the concentration of DIPA is at least 20 wt. % of the oil phase.

As used herein, the term "patient", which is in some embodiments interchanged with the term "subject", refers to a human or any other animal suffering from a health condition. A subject may refer to a human presenting to a medical provider for diagnosis or treatment of a skin condition, or any other condition.

A skilled artisan would appreciate that the pharmaceutical compositions disclosed herein should be administered in an appropriate dosage such as to achieve delivery of a therapeutically effective amount. I.e., in an amount sufficient as to assess an amelioration of the medical condition treated.

Unless otherwise defined herein, scientific and technical terms used in connection with the present application shall have the meanings that are commonly understood by those of ordinary skill in the art. Further, unless otherwise required by context, singular terms shall include pluralities and plural terms shall include the singular.

In the present disclosure the singular forms "a," "an," and "the" include the plural reference, and reference to a particular numerical value includes at least that particular value, unless the context clearly indicates otherwise. The term "plurality", as used herein, means more than one. When a range of values is expressed, another embodiment includes from the one particular and/or to the other particular value. Similarly, when values are expressed as approximations, by use of the antecedent "about," it is understood that the particular value forms another embodiment. All ranges are inclusive and combinable. In some embodiments, the term "about", refers to a deviance of between 0.0001-5% from the indicated number or range of numbers. In some embodiments, the term "about", refers to a deviance of between 1-10% from the indicated number or range of numbers. In some embodiments, the term "about", refers to a deviance of up to 25% from the indicated number or range of numbers. The term "comprises" means encompasses all the elements listed, but may also include additional, unnamed elements, and it may be used interchangeably with the terms "encompasses", "includes", or "contains" having all the same qualities and meanings. The term "consisting of" means being composed of the recited elements or steps, and it may be used interchangeably with the terms "composed of" having all the same qualities and meanings.

EXAMPLES

The Examples described in this section list certain excipient grades by reference to their trade names. The following list provides corresponding technical designations of the respective materials:

Brij® S2: Polyoxyethylene (2) stearyl ether, (Steareth-2)
Brij® S721: Polyoxyethylene (21) stearyl ether, (Steareth-21)
Carbopol® Ultrex 10 NF: Carbomer Interpolymer Type A
Carbopol® 5984 EP: Carbomer Homopolymer Type B
Carbopol® 980 NF: Carbomer Homopolymer Type C
Capryol® 90: Propylene glycol caprylocaprate type II
Transcutol®: Diethylene glycol monoethyl ether Example 1: Lotion Formulations These examples exhibit oil phases essentially consisting of diisopropyl adipate (DIPA) in combination with either medium-chain triglycerides (MCT) or castor oil, and the active ingredient which is present in fully dissolved form.

The compositions shown in Table 1 (series A) were prepared by dissolving citric acid in DIPA under stirring at 70±2° C., then adding mometasone furoate and dissolving it (phase 1). Then, Brij® S2 was dissolved in MCT at 70±2° C. (phase 2). Phases 1 and 2 were then mixed under stirring at 70±2° C. on a magnet stirrer with heating plate set to a stirring rate of 200-500 rpm, resulting in the oil phase of the formulation. Phase 3 was prepared by adding potassium sorbate, Brij® S721, citric acid, sodium citrate and water and heating to 70±2° C. under stirring at 200-500 rpm. While stirring, xanthan (Xantural® 180) was added under brief homogenization using an Ultra-Turrax® T 25 homogenizer set at 10000-15000 rpm. The oil phase (phases 1/2) was then added to phase 3 and homogenized at 10000-15000 rpm. The resulting formulation was cooled down to 30° C. (±2° C.) while stirring with a spatula and filled into the primary packaging.

TABLE 1

Composition of lotion formulations (series A)

| Ingredient | F001 wt. % | F002 wt. % | F003 wt. % | F004 wt. % | F005 wt. % | F006 wt. % | F007 wt. % | F009 wt. % |
|---|---|---|---|---|---|---|---|---|
| Mometasone furoate | 0.1 | 0.1 | 0.1 | 0.1 | 0.1 | 0.1 | 0.1 | 0.1 |
| DIPA | 19.80 | 19.80 | 19.80 | 19.80 | 19.80 | 17.60 | 19.80 | 20.00 |
| Castor Oil | — | — | 4.40 | 4.40 | — | 6.60 | 4.40 | — |
| MCT | 10.20 | 10.20 | 19.80 | 19.80 | 10.20 | 19.80 | 19.80 | 20.00 |
| Brij S2 | 1.00 | 1.00 | 1.00 | 1.00 | 1.00 | 1.00 | 1.00 | 10.00 |
| Brij S721 | 1.00 | 1.00 | 1.00 | 1.00 | 1.00 | 1.00 | 1.00 | 1.00 |
| Phenoxy ethanol | — | 1.00 | — | 1.00 | 1.00 | — | 1.00 | 1.00 |
| Potassium sorbate | 0.20 | 0.20 | 0.20 | 0.20 | 0.20 | 0.20 | 0.20 | 1.00 |
| Xanthan | 0.50 | 0.25 | 0.50 | 0.35 | 0.35 | 0.50 | 0.30 | 0.20 |
| Citrate buffer pH 4.2 | — | — | — | — | 66.35 | — | 52.40 | 0.30 |
| Citrate buffer pH 4.8 | — | 66.45 | — | 52.35 | — | — | — | 46.40 |
| Citrate buffer pH 5.4 | 67.20 | — | 53.20 | — | — | 53.20 | — | — |
| PH | 5.72 | 5.30 | 5.86 | 5.43 | 4.69 | 5.85 | 4.99 | 4.95 |

All formulations were pourable, showed a favourable viscosity profile, and good physical and chemical stability. No recrystallisation of the active ingredient was observed.

A further series of lotion compositions as shown in Table 2 (series B) were prepared.

The appearance and rheological behaviour were comparable to the compositions of series A. For some of the series B compositions, preservation efficacy tests were also performed. For formulations F010, F012, F018, F019, and F026, it was confirmed that they meet the preservation efficacy criteria of USP and Pharm Eur.

Example 2: Cream Formulations

Cream formulations were prepared based on the solvent system, or oil phase, of lotion formulation F005 (Table 1). The cream formulations were characterized by a non-pourable character and viscosity values at 100 1/s which are at least 10-times higher than those of the lotion formulations described in Example 1. The respective compositions are provided in Table 3.

It may be assumed that as alternatives to polyacrylate (carbomer)-based thickeners, other polymeric thickeners like as cellulose derivatives, such as hydroxypropyl cellulose, carboxymethyl cellulose, or hydroxypropylmethylcellulose, may also be used.

TABLE 2

Composition of lotion formulations (series B)

| Ingredient | F010 wt. % | F011 wt. % | FO12 wt. % | F017 wt. % | F018 wt. % | F019 wt. % | FO22 wt. % | F026 wt. % |
|---|---|---|---|---|---|---|---|---|
| Mometasone furoate | 0.1 | 0.1 | 0.1 | 0.1 | 0.1 | 0.1 | 0.1 | 0.1 |
| DIPA | 19.8 | 19.8 | 19.8 | 19.8 | 19.8 | 19.8 | 19.8 | 19.8 |
| Castor Oil | — | 4.4 | — | 4.4 | — | 4.4 | — | — |
| MCT | 10.2 | 19.8 | 10.2 | 19.8 | 10.2 | 19.8 | 10.2 | 10.2 |
| Brij S2 | 1.0 | 1.0 | 1.0 | 1.0 | 1.0 | 1.0 | 1.0 | 1.0 |
| Brij S721 | 1.0 | 1.0 | 1.0 | 1.0 | 1.0 | 1.0 | 1.0 | 1.0 |
| Phenoxy ethanol | 1.0 | 1.0 | — | 1.0 | — | — | — | — |
| Butylated hydroxyanisole | — | — | — | — | — | — | — | 0.05 |
| Potassium sorbate | 0.2 | 0.2 | 0.2 | 0.25 | 0.25 | 0.25 | 0.25 | 0.25 |
| Xanthan gum | 0.35 | 0.3 | 0.35 | 0.3 | 0.35 | 0.3 | 0.35 | 0.35 |
| Citric acid anhydrous | 0.275 | 0.265 | 0.275 | 0.265 | 0.275 | 0.265 | 0.29 | 0.29 |
| Sodium citrate dihydrate | 0.23 | 0.19 | 0.23 | 0.135 | 0.175 | 0.135 | 0.16 | 0.16 |
| Water | 65.845 | 51.945 | 66.845 | 51.95 | 66.85 | 52.95 | 66.85 | 66.80 |
| PH | 4.62 | 4.59 | 4.64 | 4.59 | 4.6 | 4.64 | 4.7 | 4.6 |

TABLE 3

Composition of cream formulations

| Ingredient | F008 wt. % | F020 wt. % | F021 wt. % |
|---|---|---|---|
| Mometasone furoate | 0.1 | 0.1 | 0.1 |
| Citric acid anhydrous | — | 0.01 | 0.01 |
| DIPA | 19.80 | 19.80 | 19.80 |
| Castor Oil | — | — | — |
| MCT | 10.20 | 10.20 | 10.20 |
| Brij S2 | 1.00 | 1.00 | 1.00 |
| Brij S721 | 1.00 | 1.00 | 1.00 |
| Phenoxy ethanol | 1.00 | — | — |
| Potassium sorbate | 0.20 | 0.25 | 0.25 |
| Carbopol Ultrex 10 NF | 1.00 | — | — |
| Carbopol 5984 EP | — | — | 1.00 |
| Carbopol 980 NF | — | 1.00 | — |
| Water | 65.46 | 65.48 | 65.64 |
| Sodium hydroxide 30 wt. % | 0.24 | — | — |
| Sodium hydroxide 1 M | — | 1.16 | 1.00 |
| pH | 4.78 | 4.60 | 4.58 |

Example 3: Foam Formulations

The foams were initially prepared as foams bases (Table 4), which were further mixed with a volatile propellant to produce the compositions for use in aerosol cans (Table 5). After application on the skin, the propellant is expected to quickly evaporate, resulting again in the base formulations. All foams resulted in cosmetically attractive and stable foams.

TABLE 4

Compositions of foam base formulations

| Ingredient | FB001 wt. % | FB002 wt. % | FB003 wt. % | FB004 wt. % | FB005 wt. % |
|---|---|---|---|---|---|
| Mometasone furoate | 0.1 | 0.1 | 0.1 | 0.1 | 0.1 |
| DIPA | 19.8 | 19.8 | 19.8 | 19.8 | 19.8 |
| Castor Oil | | 4.4 | | | 4.4 |
| MCT | 10.2 | 19.8 | 10.2 | 10.2 | 19.8 |
| Brij S2 | 1 | 1 | 2 | 1 | 1 |
| Stearyl alcohol | | | 2 | 2 | 2 |
| Myristyl alcohol | | | 2 | 2 | 2 |
| Brij S721 | 1 | 1 | 3 | 2 | 2 |
| Phenoxy ethanol | 1 | 1 | 1 | 1 | 1 |
| Potassium sorbate | 0.2 | 0.25 | 0.2 | 0.2 | 0.25 |
| Xanthan gum | 0.35 | 0.3 | 0.35 | 0.35 | 0.3 |
| Citric acid anhydrous | 0.275 | 0.265 | 0.275 | 0.275 | 0.265 |
| Sodium citrate dihydrate | 0.23 | 0.135 | 0.23 | 0.23 | 0.135 |
| Water | 65.845 | 51.95 | 58.845 | 60.845 | 46.95 |
| PH | 4.64 | 4.64 | 4.61 | 4.68 | 4.6 |

TABLE 5

Composition of foam formulations including propellant

| Ingredient | FOAM_1 wt. % | FOAM_2 wt. % | FOAM_3 wt. % | FOAM_4 wt. % | FOAM_5 wt. % |
|---|---|---|---|---|---|
| Mometasone furoate | 0.09 | 0.09 | 0.09 | 0.09 | 0.09 |
| DIPA | 17.82 | 17.82 | 17.82 | 17.82 | 17.82 |
| Castor Oil | | 3.96 | | | 3.96 |
| MCT | 9.18 | 17.82 | 9.18 | 9.18 | 17.82 |
| Brij S2 | 0.90 | 0.90 | 1.80 | 0.90 | 0.90 |
| Stearyl alcohol | | | 1.80 | 1.80 | 1.80 |
| Myristyl alcohol | | | 1.80 | 1.80 | 1.80 |
| Brij S721 | 0.90 | 0.90 | 2.70 | 1.80 | 1.80 |
| Phenoxy ethanol | 0.90 | 0.90 | 0.90 | 0.90 | 0.90 |
| Potassium sorbate | 0.18 | 0.225 | 0.18 | 0.18 | 0.225 |
| Xanthan gum | 0.315 | 0.27 | 0.315 | 0.315 | 0.27 |
| Citric acid anhydrous | 0.248 | 0.239 | 0.248 | 0.248 | 0.239 |
| Sodium citrate dihydrate | 0.207 | 0.122 | 0.207 | 0.207 | 0.122 |
| Water | 59.265 | 46.755 | 52.961 | 54.761 | 42.255 |
| Propellant* | 10.0 | 10.0 | 10.0 | 10.0 | 10.0 |

*isobutane 60-90 wt. %. propane 5-35 wt. %. n-butane 0-6 wt %

Example 4: Characterization of the Formulations

Microscopic appearance. All lotion formulations shown in Tables 1 and 2 exhibited a homogeneous appearance with very fine droplets in the one micrometer range. Lab batch formulations showed occasional air bubbles immediately after preparation. Such air bubbles are avoided in pilot and commercial stage by applying a vacuum during manufacturing. Also the cream formulations showed a homogeneous appearance with very fine droplets in the range of a few micrometres.

Viscosity. Samples were analysed with the rheometer MCR 102 from Anton Paar GmbH. A concentric cylinder CC27 from Anton Paar was used as measuring system. The temperature was maintained at 20° C. via the Peltier P-PTD200/Air.

All tested formulation showed a shear-thinning behaviour, which is favourable as it allows good physical stability and at the same time good spreadability. For lotion formulations (Table 6), shear viscosity was around 10-times lower than for cream formulations (Table 7).

TABLE 6

Shear viscosity of selected lotion formulations

| Formulation | Zero shear viscosity [Pa * s] | Viscosity at 100 1/s [Pa*s] |
|---|---|---|
| F005 | 399.6 | 0.141 |
| F007 | 1,515.3 | 0.202 |
| F018 | 338.2 | 0.147 |

TABLE 7

Shear viscosity of selected cream formulations

| Formulation | Zero shear viscosity [Pa * s] | Viscosity at 100 1/s [Pa*s] |
|---|---|---|
| F008 | 83,039.0 | 3.554 |
| F020 | 97,987.0 | 4.141 |
| F021 | 94,067.0 | 3.767 |

Foam structure. All formulations resulted in stable, fine foams and maintained the foam structure for at least 10 minutes.

Chemical stability. Formulations F005 and F007 underwent an exploratory stability test at 25° C. for 5 months. No change in content and no degradation products could be identified.

Formulations F010 and F011 underwent a 12 weeks stability study including storage at elevated temperatures of up to 60° C. Both F010 (Table 8) and F011 (Table 9) showed very good chemical stability.

Due to the high stability of mometasone furoate and the lack of degradation at most temperatures, a shelf-life prediction based on Arrhenius plot was not possible for formulations F010 and F011. However, the data supported an estimated shelf-life of at least two years at 25° C.

For formulation F022, a stability study in LDPE bottles was performed. At elevated temperatures, an increase in the drug content (assay) of the bottles was observed. Said increase can be attributed to weight loss as LDPE shows some permeability for water (Table 10). These experiments further supported previous results showing good stability of mometasone in the formulations analysed.

TABLE 8

Chemical stability of formulation F010

| Weeks | 5° C. | 25° C. | 30° C. | 40° C. | 50° C. | 60° C. |
|---|---|---|---|---|---|---|
| 0 | D3: <LOQ<br>U1: <LOQ | D3: <LOQ<br>U1: <LOQ | D3: <LOQ<br>U1: <LOQ | D3: <LOQ<br>U1: <LOQ | D3: <LOQ<br>U1: <LOQ | D3: <LOQ<br>U1: <LOQ |
| 1 | n.d. | n.d. | n.d. | n.d. | D3: <LOQ | D3: <LOQ |
| 3 | n.d. | D3: <LOQ<br>U1 <LOQ | D3: <LOQ | D3: <LOQ | D3: <LOQ | D1: <LOQ<br>D3: <LOQ |
| 4 | n.d. | n.d. | n.d. | n.d. | D3: 0.114%<br>U1: <LOQ | D1: <LOQ<br>D3: 0.111%<br>U1: <LOQ |
| 6 | n.d. | D3: 0.114%<br>U1: <LOQ | D3: 0.111%<br>U1: <LOQ | D3: 0.112%<br>U1: <LOQ | D3: 0.105 %<br>U1: <LOQ | D1: 0.158%<br>D3: 0.114%<br>U1: <LOQ |
| 9 | n.d. | D3: 0.110%<br>U1: <LOQ | D3: 0.109%<br>U1: <LOQ | D3: 0.101%<br>U1: <LOQ | D3: 0.104%<br>U1: <LOQ | D1: 0.200 %<br>D2: 0.145 %<br>D3: 0.112%<br>U1: <LOQ |
| 12 | D3: <LOQ<br>U1: <LOQ | D3: 0.118%<br>U1: <LOQ | D3: 0.125 %<br>U1: <LOQ | D3: 0.119%<br>U1: <LOQ | DI: <LOQ<br>D3: 0.116%<br>U1: <LOQ | D1: 0.307%<br>D3: 0.118%<br>U1: <LOQ |

U1, U2, U3: Unknown impurities
D1, D2, D3: Known impurities
LOQ: <0.1% of API in formulation
n.d.: not determined

TABLE 9

Chemical stability of formulation F011

| Weeks | 5° C. | 25° C. | 30° C. | 40° C. | 50° C. | 60° C. |
|---|---|---|---|---|---|---|
| 0 | D3: <LOQ<br>U1: <LOQ | D3: <LOQ<br>U1: <LOQ | D3: <LOQ<br>U1: <LOQ | D3: <LOQ<br>U1: <LOQ | D3: <LOQ<br>U1: <LOQ | D3: <LOQ<br>U1: <LOQ |
| 1 | n.d. | n.d. | n.d. | n.d. | D3: <LOQ | D3: <LOQ |
| 3 | n.d. | D3: <LOQ | D3: <LOQ | D3: <LOQ | D3: <LOQ | D1: <LOQ |
| 4 | n.d. | n.d. | n.d. | n.d. | D3: 0.106%<br>U1: <LOQ | D1: <LOQ<br>D3: 0.111%<br>U1: <LOQ |
| 6 | n.d. | D3: 0.106%<br>U1: <LOQ | D3: 0.111%<br>U1: <LOQ | D3: 0.104%<br>U1: <LOQ | D3: 0.105 %<br>U1: <LOQ | D1: 0.116%<br>D3: <LOQ<br>U1: <LOQ |
| 9 | n.d. | D3: 0.110%<br>U1: <LOQ | D3: 0.109%<br>U1: <LOQ | D3: 0.101%<br>U1: <LOQ | D3: 0.104%<br>U1: <LOQ | D1: 0.171 %<br>D2: 0.105 %<br>U1: <LOQ<br>U2: <LOQ<br>U3: <LOQ |
| 12 | D3: <LOQ<br>U1: <LOQ | D3: 0.101%<br>U1: <LOQ | D3: 0.107%<br>U1: <LOQ | D3: 0.103%<br>U1: <LOQ | D1: <LOQ<br>D3: 0.105%<br>U1: <LOQ<br>U3: <LOQ | D1: 0.223%<br>D3: <LOQ<br>U1: <LOQ<br>U2: <LOQ<br>U3: 0.142% |

U1, U2, U3: Unknown impurities
D1, D2, D3: Known impurities
LOQ: <0.1% of API in formulation
n.d.: not determined

TABLE 10

Chemical stability of formulation FO22 in LDPE bottles

| t [weeks] | 5° C. | 25° C. | 30° C. | 40° C. | 50° C. |
|---|---|---|---|---|---|
| t = 0 | 0.1018 | 0.1018 | 0.1018 | 0.1018 | 0.1018 |
| t = 6 | 0.1017 | 0.1028 | 0.1030 | 0.1039 | 0.1077* |
| t = 12 | 0.1030 | 0.1040 | 0.1052* | 0.1062* | 0.1134* |
| Delta % | 1.18 | 2.16 | 3.34 | 4.32 | 11.39 |

*Out-of-specification (OOS)-result

Based on the similarity of the lotion, cream and foam formulations, a very good chemical stability can be predicted also for the cream and foam formulations.

Physical stability. Formulations F005 and F007 were macroscopically and microscopically stable for at least 23 weeks at room temperature. No change in appearance was observed.

Furthermore, the physical stability of formulations F010 and F011 was evaluated. The appearance and form of the samples was tested and described based on organoleptic assessment. According to the specification, an emulsion was expected. In result, no change in the macroscopic form of the emulsion was observed for formulations F010 and F011 over 12 weeks of storage at 5° C., 25° C., 30° C., 40° C., 50° C.

The colour of formulations F010 and F011 was assessed subjectively by comparing samples against a white background. A white colour was expected according to the specifications. In result, the colour of both formulations was always white. No change in colour was observed for F010 and F011 over 12 weeks of storage at 5° C., 25° C., 30° C., 40° C., 50° C., and 60° C.

The odour of F010 and F011 was also assessed subjectively, immediately after preparation as well as after storage. According to the specification, no odour or a slight characteristic odour were expected. In result, the odour of both formulations was as expected, and no change in odour was observed for F010 and F011 over 12 weeks of storage at 5° C., 25° C., 30° C., 40° C., 50° C. and 60° C.

The pH of the formulations F010 and F011 was determined potentiometrically. The values remained stable in the target range of 4.0 to 5.0 (Table 11).

TABLE 11 pH of formulations F010 and F011

| | pH values F010 | | | | | pH values F011 | | | | |
|---|---|---|---|---|---|---|---|---|---|---|
| F010 | 25° C. | 30 °C | 40° C. | 50° C. | 60° C. | 25° C. | 30° C. | 40° C. | 50 °C | 60° C. |
| Start | | | 4.6 | | | | | 4.6 | | |
| 6 weeks | 4.6 | 4.6 | 4.6 | 4.6 | 4.6 | 4.6 | 4.6 | 4.6 | 4.6 | 4.6 |
| 12 weeks | 4.5 | 4.5 | 4.4 | 4.5 | 4.5 | 4.5 | 4.5 | 4.5 | 4.5 | 4.5 |

The microscopic appearance of the emulsions was evaluated with a Zeiss Axioscope Lab A.1 using 40× objectives. Two smears of the undiluted formulation samples were evaluated. In result, the microscopic appearance of both F010 and F011 remained homogeneous over 12 weeks of storage at 5° C., 25° C., 30° C., 40° C., 50° C. and 60° C. No drug crystals were observed.

TABLE 12

Physical stability of formulations F020 and F021

| Time | Temp | Parameter | F020 | F021 |
|---|---|---|---|---|
| Start | | Appearance | soft, white, fine, homogeneous cream without crystals | soft, white, fine, homogeneous cream without crystals |
| Start | | pH | 4.6 | 4.6 |
| Start | | Viscosity (100 1/s) | 4.14 Pa*s | 3.77 Pa*s |
| 6 weeks | 25° C. | Appearance | unchanged | unchanged |
| 6 weeks | 25° C. | Microscopy | unchanged | unchanged |
| 6 weeks | 25° C. | pH | 4.6 | 4.6 |
| 6 weeks | 25° C. | Viscosity (100 1/s) | 3.54 Pa*s | 3.17 Pa*s |
| 6 weeks | 40° C. | Appearance | unchanged | unchanged |
| 6 weeks | 40° C. | Microscopy | unchanged | unchanged |
| 6 weeks | 40° C. | PH | 4.6 | 4.6 |
| 6 weeks | 40° C. | Viscosity (100 1/s) | 3.23 Pa*s | 2.78 Pa*s |
| 12 weeks | 25° C | Appearance | unchanged | unchanged |
| 12 weeks | 25° C | Microscopy | unchanged | unchanged |
| 12 weeks | 25° C | Viscosity (100 1/s) | 2.42 Pa*s | 2.79 Pa*s |
| 12 weeks | 40° C. | Appearance | unchanged | unchanged |
| 12 weeks | 40° C. | Microscopy | unchanged | unchanged |
| 12 weeks | 40° C. | Viscosity (100 1/s) | 2.49 Pa*s | 2.27 Pa*s |

Moreover, the cream formulations F020 and F021 were assessed for physical stability in a 12 weeks study. No physical changes were observed (Table 12), therefore both formulations were considered physically stable.

Example 5: Skin Penetration of Lotion Formulations F005 and F007

The skin penetration behaviour of mometasone furoate in F005 and F007 lotions (1 mg/g) was investigated and compared to MomeGALEN® 1 mg/g cream and MONOVO® 1 mg/g emulsion (lotion). A viable pig ear model (Hamburg model) was used. Viable pig skin shows excellent correlation with viable human skin in terms of skin penetration. The concentration of mometasone in the epidermis and upper dermis was investigated.

In result, Formulations F005 and F007 showed similar or slightly better skin penetration as compared to the commercial lotion. The drug concentration values were also comparable to those of the commercial cream (Table 13).

TABLE 13

Skin penetration of formulations F005, F007 and reference products

|  | MomeGALEN® Creme (Cream) | MONOVO® Emulsion (Lotion) | F005 Lotion | F007 Lotion |
|---|---|---|---|---|
| Epidermis | 147 ± 58.5 | 39.6 ± 25.2 | 64.9 ± 37.6 | 97.9 ± 41.7 |
| Dermis | 8.52 ± 5.68 | 4.51 ± 2.38 | 13.6 ± 8.76 | 13.9 ± 6.23 |

Values express the amount of mometasone furoate [ng] per mg skin

Example 6: In Vitro Release

In vitro release was studied for lotion formulation F022 and foam formulation FOAM_1 based on formulation F010. MomeGalen® was used as a standard reference.

Lotion formulation F022. Formulation F022 (test) and MomeGalen® (reference) were tested in six diffusion cells, each in a single run and in an alternating order according to SUPAC-SS guidelines. Samples were taken after 40, 80, 120, 160, 200, 240 and 280 minutes for both formulations. Data were evaluated according SUPAC-SS guidelines. Infinite dosing (approx. 300 µL) and PES membranes were used. The In Vitro Release Test (IVRT) experiment was conducted over a time period of 280 minutes. Samples were analysed by using a verified chromatographic method with UV detection.

Equivalence between F022 and the reference product MomeGalen® cream was demonstrated according to the SUPAC-SS guideline (FIG. 1 and Table 14).

TABLE 14

Comparison of the in vitro release of FO22 with reference product

| Reference Product | Test Product | Lower Limit (≥75 %) | Upper Limit (≤133.33 %) | Pass/Fail |
|---|---|---|---|---|
| MomeGalen® | F022 | 113.30 % | 126.70% | Pass |

The percentages express the 90% confidence interval for the ratio of the median in vitro release rate (in the samples) for the reference formulation batch over the median in vitro release rate (in the samples) for the test formulation batch. The 90% confidence interval falls within the limits of 113.30% and 126.70%. The acceptance criteria are fulfilled.

Foam formulation FOAM_1. Foam formulation FOAM_1 (test) and lotion formulation F022 (reference) were tested in six diffusion cells, each in a single run and in an alternating order according to SUPAC-SS guidelines, as described for the previous experiment.

Prior to application, the foam was collapsed by the following procedure: Small amounts of foam formulation were sprayed stepwise into a beaker equipped with a rotating magnetic stirrer bar. The foam formulation was stirred for approx. 10 minutes to allow the foam to collapse into an emulsion. The collapsed foam was still an emulsion, as indicated by microscopy analysis. The resulting emulsion was ready to use for the IVRT.

Figure 2:
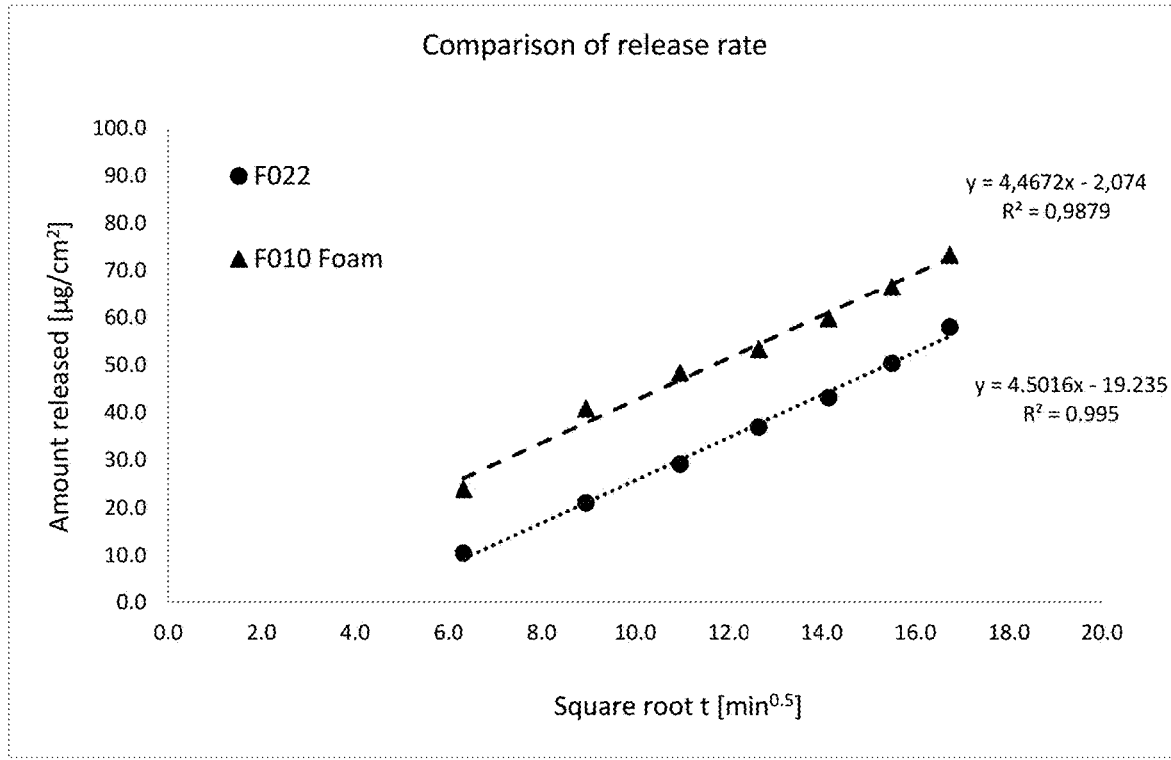
FIG. 2 shows the in vitro release kinetics for the foam formulation FOAM_1 (i.e., the foam based on formulation F010) and the reference product, lotion formulation F022.

Equivalence between the F010 foam formulation (FOAM_1) to the reference product F022 lotion was demonstrated according to the SUPAC-SS guideline (FIG. 2 and Table 15).

TABLE 15

Comparison of the in vitro release of FOAM_1 with reference product F022.

| Reference Product | Test Product | Lower Limit (≥75 %) | Upper Limit (≤133.33 %) | Pass/Fail |
|---|---|---|---|---|
| F022 (lotion) | FOAM_1 (foam) | 89.20% | 112.01% | Pass |

The percentages express the 90% confidence interval for the ratio of the median in vitro release rate (in the samples) for the reference formulation batch over the median in vitro release rate (in the samples) for the test formulation batch. The 90% confidence interval falls within the limits of 89.20% and 112.01%. The acceptance criteria are fulfilled.

Example 7: Comparison with Prior Art Lotion Formulations

Dissolution studies were performed with mometasone furoate in both the oil phase and the aqueous phase of the DIPA-containing lotion formulations of Examples 3 and 9 of DE102006034883 to determine the solubility of mometasone furoate in mg/ml in said formulations. For this purpose, first, the liquid excipients of the oil phase and the aqueous phase were mixed in the correct relative amounts to form the respective solvent systems; the low amounts of solid excipients contained in the formulations were not considered. The solubility results in mg/ml as measured in the solvents are shown in Table 16 below.

TABLE 16

Mometasone furoate solubility in solvents used in prior art formulations

| Solvent composition [wt. %] | | | Solubility of mometasone furoate [mg/ml] |
|---|---|---|---|
| Aqueous phase Ex. 3 | Phenoxy ethanol | | |
| | Polysorbate 40 | 2.6 | 0.15 |
| | Transcutol | 5.7 | |
| | Water | 12.7 | |
| Oil phase Ex. 3 | Liquid paraffin | 79.0 | |
| | ('paraffinum liquidum') | 100.0 | 0.05 |
| Aqueous phase Ex. 9 | Phenoxy ethanol | 1.5 | 0.09 |
| | Steareth 21 | 7.5 | |
| | Hexylene glycol | 15.1 | |
| | Water | 75.9 | |
| Oil phase Ex. 9 | MCT | 21.8 | 0.83 |
| | DIPA | 10.9 | |
| | Liquid paraffin | 49.1 | |
| | Capryol 90 | 18.2 | |

Based on the weight ratio between oil and water phase, the theoretical solubility of mometasone furoate in the complete formulation can then be estimated using the formula:

[proportion of oil phase·solubility in oil phase]+[proportion of aqueous phase·solubility in aqueous phase]

For instance, for Ex. 3 of DE102006034883, the oil phase (paraffinum liquidum) makes up about 20 wt. %, the remainder is the aqueous phase. Thus, the overall theoretical solubility can be estimated to about 0.13 mg/ml (0.8·0.15 mg/ml+0.2·0.05 mg/ml). For instance, for Ex. 9 of DE102006034883, the oil phase makes up 27.88 wt. %, the remainder is the aqueous phase. Thus, the overall theoretical solubility can be estimated to about 0.293 mg/ml (0.6812·0.09 mg/ml+0.2788·0.83 mg/ml).

However, the solubility required for complete dissolution of mometasone furoate is 1.0 mg/ml. This demonstrates that in both examples 3 and 9 the solubility limit is exceeded. Mometasone furoate may dissolve during the heating step in the manufacturing process but will then re-precipitate over time. This understanding was reconfirmed by Example 8 below.

Example 8: Precipitation of Mometasone Furoate in Prior Art Compositions

The inventors prepared a composition as described in Example 9 of DE102006034883, using the components and amounts as outlined in Table 17 below. Herein, this composition is labelled F028. Manufacturing of the formulation was performed according to paragraph [0038] of DE102006034883, in detail, the following manufacturing procedure was used:

Phase 1: Phenoxyethanol and hexylene glycol were mixed at 70±2° C. in a 50 ml glass beaker on a magnet stirrer with heating plate while stirring at 200-500 rpm. Then mometasone furoate, pre-weighed in a safety cabinet, was dissolve in this liquid at 70±2° C. under continued stirring at 200-500 rpm.

Phase 2: Similar to phase 1, the components of phase 2 were mixed in a 100 ml glass beaker on a magnet stirrer with heating plate at 70±2° C. while stirring at 200-500 rpm. Once both phases reached, or maintained, 70±2° C., phase 1 was added to phase 2 under continued stirring at 200-500 rpm.

Phase 3: Sodium citrate dihydrate, citric acid, and methyl 4-hydroxybenzoate and water were added to a 400 ml glass beaker and heated to 70±2° C. while stirring at 200-500 rpm. Then Brij® S721 was added and dissolved before the mixture of phases 1+2 was added at 70±2° C. and subsequently homogenized for 3 min using an Ultra-Turrax® T 25 homogenizer set at 6000-10000 rpm.

The mixture was allowed to cool down to 30±2° C. while stirring with a spatula, and then filled into glass vials which were tightly closed with a screw cap (so as to prevent access of humidity and air, specifically $O_2$, to the mixture), and stored in a stability chamber (i.e., under exclusion of light) at 25° C.

In addition to F028, a placebo formulation without mometasone furoate (labelled F029) was manufactured so as to allow for correct interpretation of the microscopic images with regard to absence or presence of mometasone furoate crystals. The composition of F029 is identical to F028 as displayed in Table 17 apart from replacing the 0.1 wt. % mometasone furoate with water (i.e., water content in F029 is 54.480 wt. %).

Figure 3:
FIG. 3 shows the phase separation occurring in prior art DIPA-containing compositions prepared according to Ex. 9 of DE102006034883, with and without mometasone furoate ('verum' F028 and 'placebo' F029, respectively), after 7 weeks storage.

Immediately after preparation, both the verum (F028) and the placebo (F029) resulted in homogenous formulations with neither of the two showing any particles in polarized light microscopic pictures. When compared again after 7 weeks of storage, mere visual inspection of both the verum and placebo formulations revealed to the naked eye that the formulations showed phase separation (into a white supernatant and a translucent, opalescent bottom fraction; see FIG. 3) and were thus considered not physically stable.

Figure 4A:
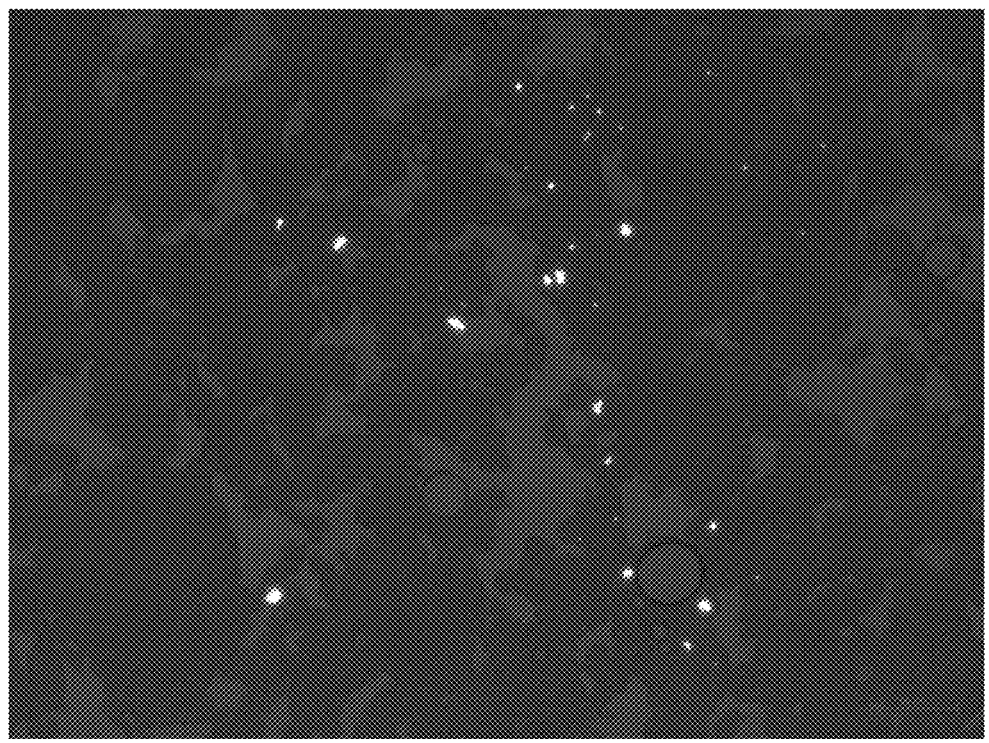
FIGS. 4A and 4B are polarized bright field microscopy pictures of the same prior art comp F028 and F029, respectively, taken after 7 weeks storage. The figures reconfirm phase separation (showing lighter coloured irregular fields without droplets) as well as showing crystals of mometasone furoate that precipitated from the initially supersaturated verum formulation (see the white/iridescent specks in FIG. 4A).
Figure 4B:
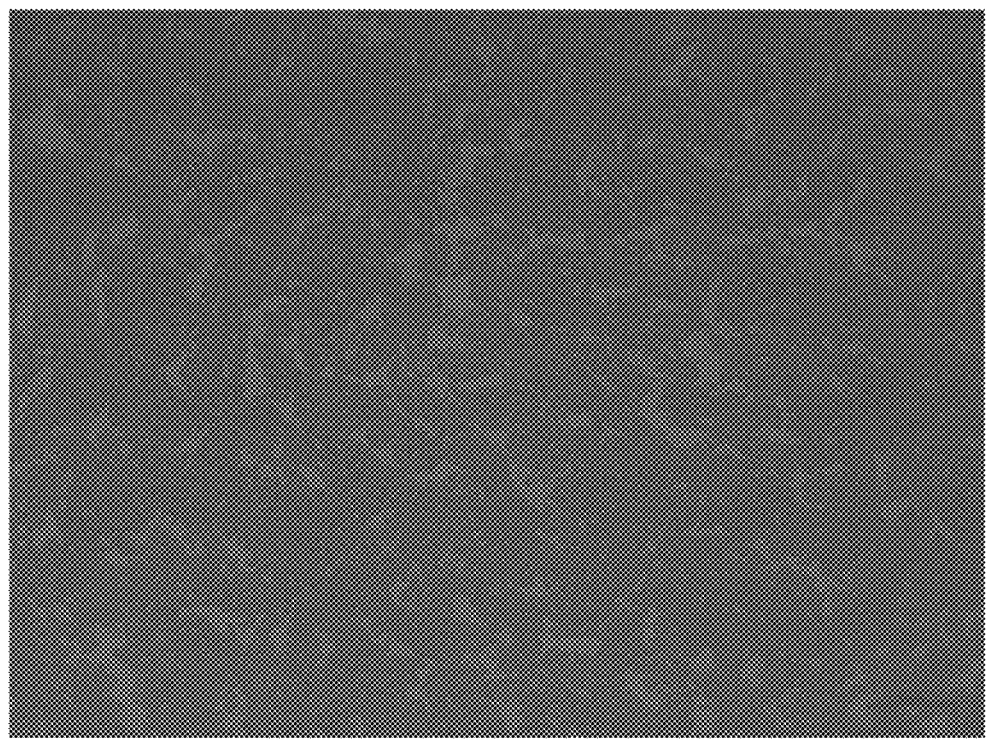

In microscopic images (see FIGS. 4A and 4B), the signs of phase separation were also visible (lighter coloured irregular fields without droplets). Moreover, after 7 weeks, in the verum formulation F028 clearly several crystals were visible in the polarized bright field micrograph (see the white/iridescent specks in FIG. 4A) whereas in the corresponding placebo formulation F029, crystals were absent (see FIG. 4B). This demonstrates that over time mometasone furoate precipitates from the initially supersaturated DIPA-containing prior art formulations described in DE102006034883.

Example 9: Investigations on Re-Precipitation of Mometasone Furoate

Similar to Example 7 above, dissolution behaviour of mometasone furoate was also tested for the DIPA-containing prior art cream formulations described in examples 10 and 11 of DE102006034883. For this purpose, mometasone furoate was dissolved in solvent systems based on Ex. 10 and 11 as follows:

Ex. 10: 0.1 parts mometasone furoate were dissolved in 1 part phenoxy ethanol and 10 parts hexylene glycol, resulting in a clear solution. Then, the aqueous phase of 40.56 parts of water was added resulting in a precipitation of mometa-

TABLE 17

Composition F028 (repetition of Example 9 of DE102006034883)

Figure 5A:
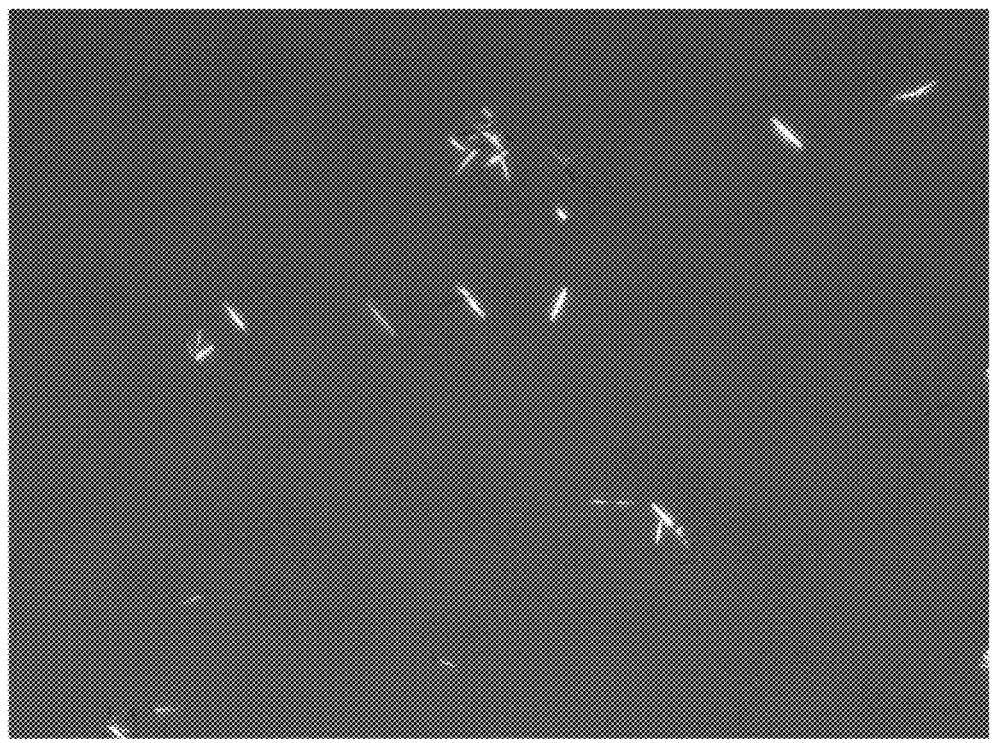
FIGS. 5A and 5B are polarized bright field microscopy pictures of mometasone furoate crystals that precipitated from prior art DIPA-containing solvent systems prepared according to Ex. 10 and 11 of DE102006034883, respectively.

| Ingredients | Batch/Supplier | wt. % |
| --- | --- | --- |
| Phase 1 | | |
| 1 Phenoxyethanol | BCCG0792/Sigma Aldrich | 1.000 |
| 2 Hexylene glycol | BCBX5696/Sigma Aldrich | 10.000 |
| 3 Mometasone furoate | MOM 001/0319/Symbiotica via Beyvers | 0.100 |
| Phase 2 | | |
| 4 DIPA | Dubcare DIPA, 20050554/Stearinerie Dubois | 3.000 |
| 5 Propylene glycol caprylate | Capryol ® 90,172122/Gattefosse | 5.000 |
| 6 MCT | Miglyol 812 N, 210202/101 Oleo GmbH | 6.000 |
| Phase 3 | | |
| 7 Paraffinum liquidum | Primol 352,19BSA0138/Exxon Mobil | 13.480 |
| 8 Sodium citrate dihydrate | UJ903/Citrique Beige | 0.320 |
| 9 Citric acid anhydrous | 0001334889/PanReac | 0.420 |
| 10 Methyl 4-hydroxybenzoate | BCBV5508/Sigma Aldrich | 0.300 |
| 11 Steareth-21 | SP Brij ® S721 MBAL-PA-(SG), 45413/via Beyvers | 6.000 |
| 12 Water | | 54.380 | sone furoate as shown in the form of white/iridescent needle-shaped crystals in the polarized light microscopy picture of FIG. 5A.

Figure 5B:
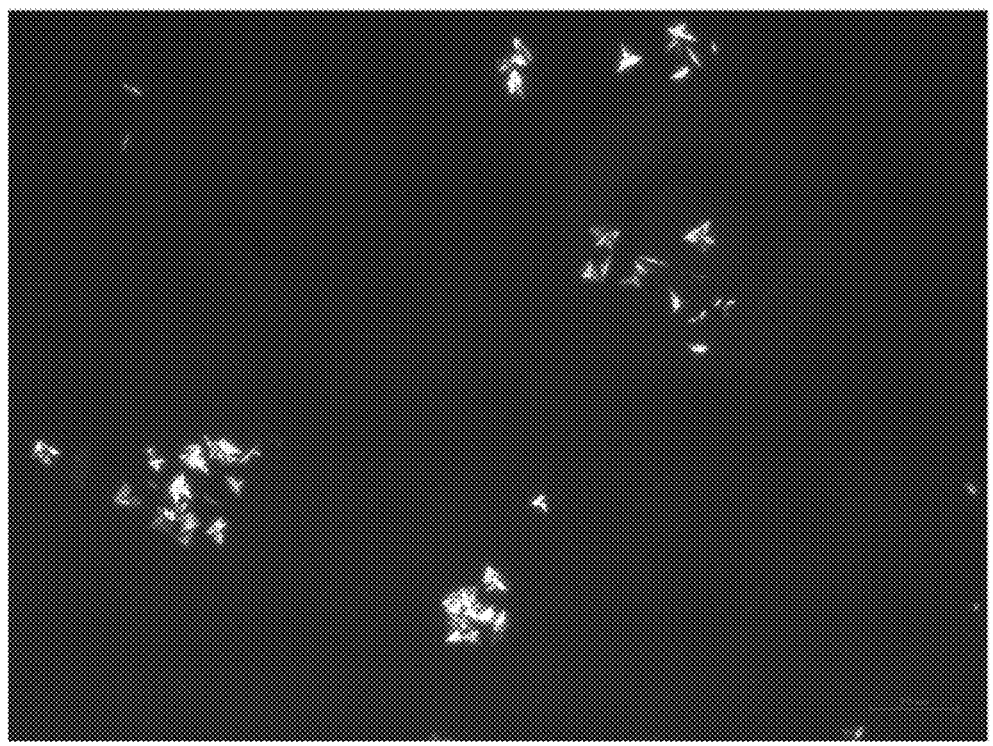

Ex. 11: 0.1 parts mometasone furoate were dissolved in 1 part phenoxy ethanol and 10 parts diethylene glycol monoethyl ether (Transcutol®), resulting in a clear solution. Then, the aqueous phase of 40.56 parts of water was added resulting in a precipitation of mometasone furoate as shown in the form of white/iridescent flake- or platelet-shaped crystals in the polarized light microscopy picture of FIG. 5B.

Example 10: Investigation on Marketed Mometasone Furoate Emulsion Formulations

Figure 6:
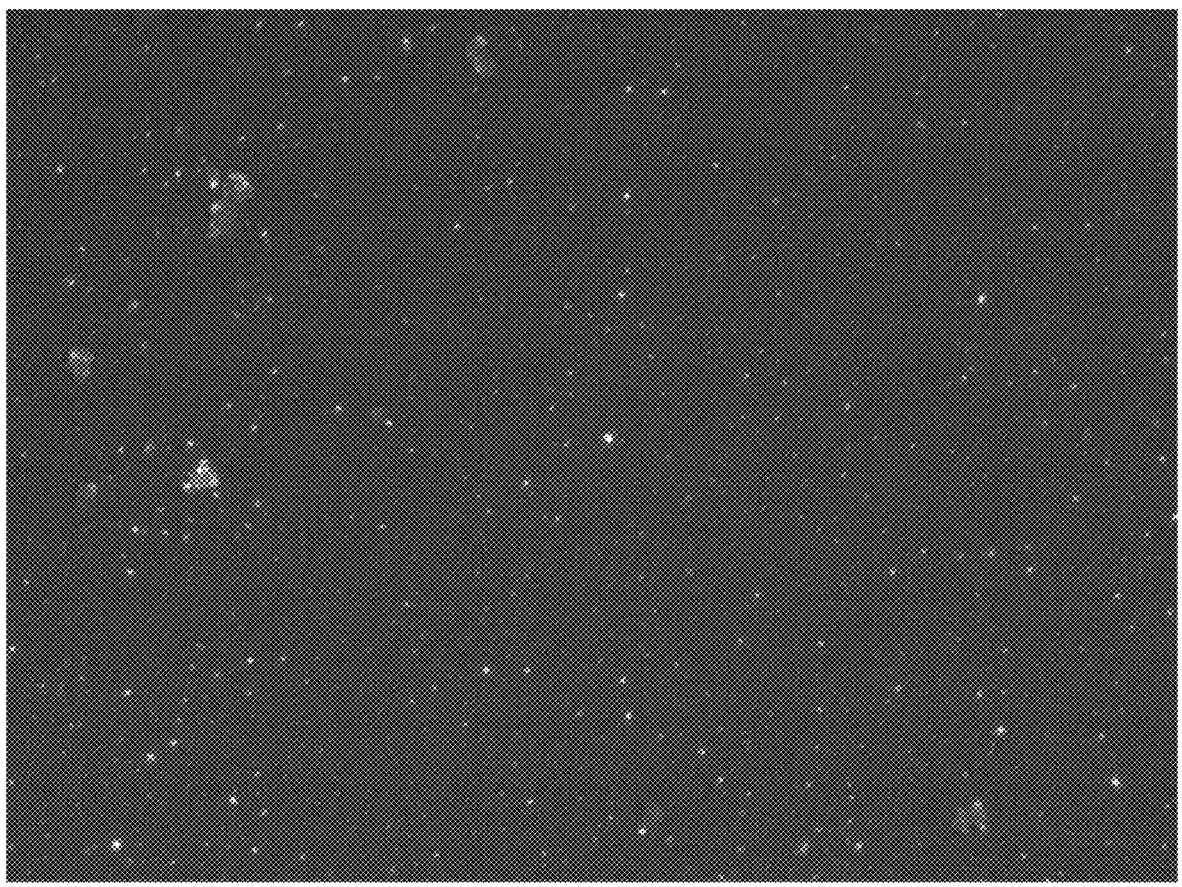
FIG. 6 shows a marketed mometasone furoate cream (Monovo® 1 mg/g) analysed under a microscope at 100-fold magnification in cross-polarized bright field mode. Numerous small mometasone crystals are clearly visible as bright white/iridescent specks.

In addition to Example 9 above, mometasone furoate crystals were also found not only in solvent systems of DE102006034883 but also in the marketed originator mometasone cream formulation Monovo® 1 mg/g (whose composition is qualitatively identical to Example 10 of DE102006034883). When analysed under a microscope at 100-fold magnification in cross-polarized bright field mode, a multitude of small mometasone crystals were clearly visible (see the numerous white/bright specks in FIG. 6), thus reconfirming that said cream product is marketed as a suspension type formulation.

This finding is also in line with the originator's explicit statement on page 5 of the Decentralised Recognition Procedure Public Assessment Report DE/H/2464/001/DC dated 13 Feb. 2018 where it states for the Monovo® 1 mg/g cream by Almirall Hermal GmbH: "The active substance is dispersed as a suspension in the cream".

The same, i.e., mometasone furoate being suspended in the cream, has also been confirmed by the providers of a generic mometasone furoate cream available on the German market (MomeGalen® Creme 0,1% Mometasonfuroat by GALENpharma GmbH).

The invention claimed is:

1. A pharmaceutical composition for topical administration comprising an oil phase, said oil phase comprising mometasone furoate and diisopropyl adipate, wherein the composition comprises from about 0.05 to about 0.1 wt. % of mometasone furoate fully dissolved in the oil phase comprising at least 20 wt. % of diisopropyl adipate based on the weight of the oil phase and at least one triglyceride oil, and wherein the weight ratio of the diisopropyl adipate to the triglyceride oil is from 30:70 to 70:30, wherein the oil phase is free of paraffin and the water phase is free of polyalcohols.

2. The pharmaceutical composition according to claim 1, wherein the triglyceride oil is selected from medium-chain triglycerides, castor oil, and combinations thereof.

3. The pharmaceutical composition according to claim 1, wherein the composition is in the form of a liquid or semisolid o/w-emulsion.

4. The pharmaceutical composition according to claim 3, wherein the oil phase represents from 25% to 50% of the weight of the composition.

5. The pharmaceutical composition according to claim 3, wherein the emulsion is foamed.

6. The pharmaceutical composition according to claim 3, wherein the semisolid o/w emulsion is a lotion, and wherein the emulsion comprises a thickener selected from xanthan, hydroxy ethyl cellulose, polyacrylate carbomer, carboxymethylcellulose sodium or calcium, methyl cellulose, hydroxypropylcellulose, hydroxypropylmethylcellulose, alginate, sodium alginate or combinations thereof.

7. The pharmaceutical composition according to claim 6, wherein the lotion is pourable and exhibits a shear viscosity in the range from 0.1 to 0.5 Pa*s at 100/s.

8. The pharmaceutical composition according to claim 3, wherein the semisolid o/w emulsion is a cream emulsion comprises a, and wherein the thickener is selected from carbomers and water-soluble cellulose ethers.

9. The pharmaceutical composition according to claim 1, wherein the oil phase is free of paraffin and/or the water phase is free of polyalcohols.

10. The pharmaceutical composition according to claim 1, wherein the composition comprises at least one nonionic surfactant.

11. The pharmaceutical composition according to claim 1, wherein the composition is in the form of an oil-in-water (o/w) emulsion and comprises from about 0.05 to about 0.1 wt. % of mometasone furoate fully dissolved in the oil phase comprising at least 20 wt. % of diisopropyl adipate and at least one triglyceride oil, wherein the weight ratio of the diisopropyl adipate to the triglyceride oil(s) is from about 30:70 to 70:30, and wherein the oil phase represents from about 25% to 50% of the oil-in-water (o/w) emulsion.

12. A method of treatment of a subject suffering from a dermatological disease or condition that is responsive to topical glucocorticoid therapy, wherein the dermatological disease or condition is selected from atopic dermatitis, atopic eczema, psoriasis, vitiligo, lichen sclerosus, or scalp psoriasis the method comprising administering the pharmaceutical composition according to claim 1 to the subject.

* * * * *